UNITED STATES PATENT OFFICE.

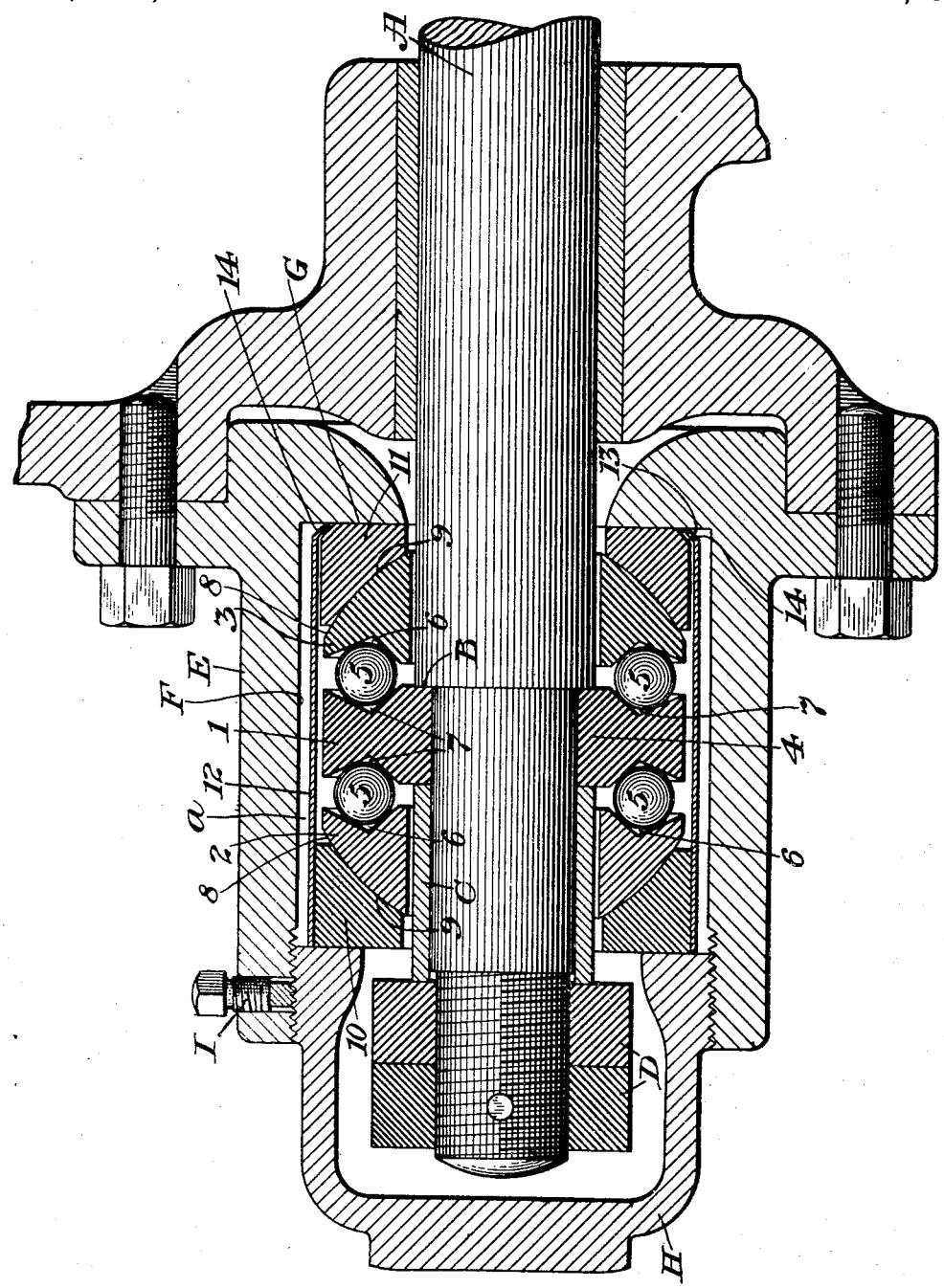

FRANCIS A. COLLINS, JR., OF ROCHESTER, NEW YORK, ASSIGNOR TO AUBURN BALL BEARING COMPANY, OF ROCHESTER, NEW YORK, A CORPORATION OF NEW YORK.

BALL-BEARING.

1,219,921.   Specification of Letters Patent.   Patented Mar. 20, 1917.

Application filed June 11, 1915. Serial No. 33,454.

*To all whom it may concern:*

Be it known that I, FRANCIS A. COLLINS, Jr., a citizen of the United States, and resident of Rochester, in the county of Monroe and State of New York, have invented certain new and useful Improvements in Ball-Bearings, of which the following is a specification.

This invention relates to ball bearings, and has for its object to provide a double thrust ball bearing which is not only capable, when installed, of slight radial movements to accommodate itself to the radial position of the shaft, due to wear of the bearings, but is also capable of accommodating itself to angular changes in the position of the shaft. A further object of the invention is to provide means for holding the parts of the bearing together to form a unit of the same, so that it may be readily handled and positioned.

With these objects in view, the invention consists in providing an intermediate annular race member capable of being secured at its hub portion to a rotary shaft, and an end race member disposed at either side of said intermediate race member, each of said end race members having a spherical portion engaging with a spherical seat on an adjacent washer, so that the three race members are capable of turning as a unit in the two washers to permit the bearing to accommodate itself to angular changes in the position of the shaft. The three race members and the two washers above referred to are bound together into a unit by an external sheet-metal sleeve hereinafter more specifically described.

The invention is illustrated in the accompanying drawing which shows the improved ball bearing applied to a rotary shaft and inclosed in a suitable housing.

The intermediate race member above referred to is shown at 1 and the end race members are shown at 2 and 3, respectively. It will be noted that these three race members are annular in shape and that the intermediate race member projects radially toward the axis of the bearing farther than the end race members to provide a projecting hub portion 4 capable of being secured to the shaft, in the manner hereinafter described. The usual anti-friction balls 5 are provided between each face of the intermediate race member and the corresponding face of each end race member. The raceways in which the anti-friction balls 5 operate may be of any desired form, but preferably they are made by providing a V-shaped groove 6 in each of the end race members and a corresponding V-shaped groove 7 in each face of the intermediate race member 1. It is immaterial to the present invention whether or not a cage or holder is provided for the balls 5, no such cage or holder being employed in the present instance.

The end race members 2 and 3 are provided with a spherical portion 8, the length of the radius of which may vary with circumstances, but the center of the generating arc of each spherical surface should lie on the longitudinal axis of the bearing. In the present instance, both of the spherical surfaces 8 are generated by arcs having a common center, so that both of the surfaces 8 are fractional surfaces of a true sphere. This condition, however, is not necessary, as the generating arcs of the two surfaces may have different centers.

The spherical surfaces 8 engage with spherical seats 9 formed on end washers 10 and 11. The said spherical seats 9 should, of course, be generated by arcs having the same center as the generating arc of the spherical surface 8 with which it coöperates.

An external sleeve 12 is secured to one of the end washers, such as that shown at 10, either by having a close fit therewith, or by any other suitable means. This sleeve incloses all of the parts of the bearing, but is loose from all of such parts, except the end washer 10. The other end washer 11 is provided with a beveled edge 13 over which an edge portion of the sleeve 12 is bent or crimped, as shown at 14. This serves to retain all of the bearing members in the sleeve and to bind them together into a unit.

The bearing as above described may be secured to its shaft and may be positioned in a suitable housing in many different ways, one of such ways being illustrated in the present instance as an example. The bearing is shown clamped at the hub portion of the intermediate race member to a rotary shaft A. For this purpose, the shaft is provided with a shoulder B, between which and a clamping sleeve C, the hub portion 4 of the intermediate race member is clamped by means of the nuts D screwed upon the extremity of the shaft A.

The housing which serves to inclose the bearing is shown at E and is provided with a central opening F for the reception of the bearing. When the bearing is positioned, the inner washer 11 abuts a suitably formed shoulder G of the housing and the outer washer 10 is abutted by the extremity of a cap H screwed into the extremity of the housing and locked in place by any suitable means, such as the set screw I.

When the bearing is positioned, sufficient clearance $a$ should be provided between the external sleeve 12 and the inner wall of the housing opening F. This is to permit radial movement of the entire bearing, and thereby permit the bearing to accommodate itself to radial movements of the shaft when the shaft bearings wear. The intermediate bearing 1 cares for the weight of the anti-friction balls 5, the end races 2 and 3, the washers 10 and 11, and the external sleeve 12, and, therefore, these parts will be properly centered by the intermediate race 1 when the bearings of the shaft wear and the shaft moves radially.

Angular changes of the shaft A are permitted by means of the spherical surfaces 8 on the end race members engaging with the spherical seats 9 on the end washers. It is obvious that angular changes in the position of the shaft will turn the three race members as a unit in the two washers 10 and 11, which then act as a socket. The pressure is, therefore, always evenly distributed to the anti-friction balls and no cramping action will take place thereon, either by angular changes in the position of the shaft or radial changes in the position thereof.

When the bearing is installed, the intermediate race member 1 is rigidly carried by and rotates with the shaft A and serves to transmit the end thrusts of the shaft to the end race members 2 and 3, which are braced against axial movement, and, therefore, the end thrusts of the shaft are effectively resisted.

It will be noted from the foregoing description that the external sleeve 12 serves to bind all of the parts of the bearing together into a unit, so that the same may be readily handled and positioned, and that the positioning and securing of the bearing to the shaft is additionally facilitated by the projecting hub portion 4 of the intermediate race member, which provides convenient means for clamping or otherwise securing the intermediate race member of the bearing to the shaft.

The washers 10 and 11 may be held against rotation by dowel pins, set screws or the like, if so desired, and the external sleeve 12 may be provided with perforations adjacent the anti-friction balls 5 to permit lubrication of the latter, if this is also desired.

Obviously the ball bearing herein described may be used in combination with numerous different forms of housings, that herein shown being merely exemplary. Furthermore, numerous modifications and changes may be made in the structure of the ball bearing itself without departing from the spirit or scope of the invention, as defined in the accompanying claims.

What I claim is:—

1. An end thrust ball bearing, comprising an annular intermediate race member, an annular end race member disposed at either side thereof, each of said end race members having a spherical surface, an annular element disposed adjacent each of the end race members, said annular elements being non-contiguous and each having a seat for engagement by said spherical surface of the adjacent end race member, anti-friction balls disposed between said race members, and an external sheet-metal sleeve telescoped over said annular elements and serving to bind all of the elements of the bearing into a unit.

2. An end thrust ball bearing, comprising an annular intermediate race member, an annular end race member disposed at either side thereof, each of said end race members having a spherical surface, an annular element disposed adjacent each of the end race members and having a seat for engagement by said spherical surface of the adjacent end race member, anti-friction balls disposed between said race members, and an external sheet-metal sleeve serving to bind all of the elements of the bearing into a unit, the intermediate race member projecting radially toward the axis of the bearing farther than the other elements of the bearing to provide means for securing said intermediate race member to a shaft.

3. An end thrust ball bearing, comprising an annular intermediate race member, an annular end race member disposed at either side thereof, each of said end race members having a spherical surface, an annular washer disposed adjacent each of the end race members, said annular washers being non-contiguous and each having a spherical seat for engagement by said spherical surface of the adjacent end race member, antifriction balls disposed between said race members, and an external sheet-metal sleeve telescoped over said annular washers serving to bind all of the elements of the bearing into a unit.

Signed at Rochester, in the county of Monroe, and State of New York, this 8th day of June, A. D. 1915.

FRANCIS A. COLLINS, Jr.

Witnesses:
 Thos. D. Patton,
 Robt. J. Garrison.